Aug. 20, 1935.  C. H. RICH ET AL  2,011,828

GAS SCRUBBER

Filed July 15, 1932

INVENTORS
CARL H. RICH
KEVORK K. NAHIGYAN
BY
Albert G. Blodgett
ATTORNEY

Patented Aug. 20, 1935

2,011,828

UNITED STATES PATENT OFFICE 2,011,828

GAS SCRUBBER

Carl H. Rich and Kevork K. Nahigyan, Worcester, Mass., assignors to Riley Stoker Corporation, Worcester, Mass., a corporation of Massachusetts Application July 15, 1932, Serial No. 622,658

10 Claims. (Cl. 183—21)

This invention relates to gas scrubbers, and more particularly to scrubbers having deflecting members located in the path of the gases and supplied with water or other suitable liquid by gravity from an upper tank.

In gas scrubbers of this general type, it is the practice to distribute the water among the deflecting member by means of restricted openings or orifices, located in the bottom of the tank. In some cases, several orifices are required for each deflecting member. It is desirable that these orifices be of ample size, so as to reduce the liability of their becoming obstructed by particles of foreign matter carried by the water. However, if the orifices are increased in size it becomes necessary to reduce the depth of the water above the orifices, in order to prevent an increase in the quantity of water flowing to the deflecting members. In actual commercial usage it is not practical to reduce the depth of the water beyond certain limits, since float valves cannot be depended upon to control the water level with extreme accuracy, and any variation in the water level will cause fluctuations in the rate of flow. Furthermore, any inaccuracy in the leveling of the tank will produce a decidedly uneven distribution of the water among the orifices in the event the normal water level is but slightly above the orifices. The problem is of particular importance in installations in which the gas is under suction, that is, at a sub-atmospheric pressure, since this tends to increase the rate of water flow and necessitates the use of still smaller orifices.

It has heretofore been proposed to close the upper tank and to provide a pressure equalizing connection between the tank and the gas passage. Such a construction has a number of disadvantages, since it is difficult to provide a cover for the tank which will remain tight after several removals and replacements, and the various parts are in any event rendered inaccessible. Moreover, the construction is of no advantage so far as orifice size is concerned, except when the gas is under suction.

It is accordingly the main object of the present invention to provide a gas scrubber so constructed and arranged that the openings which serve to distribute liquid to the gas deflecting members may be of substantial size, and yet a considerable depth of liquid may be provided above the orifices without producing excessive flow.

It is a further object of the invention to provide a gas scrubber in which the various parts which serve to distribute the liquid are readily accessible for inspection or replacement, and in which the liquid distributing orifices may be comparatively large even though the gas is under suction.

It is a further object to provide a simple, compact, and easily manufactured device for distributing liquid to the deflecting members of a gas scrubber.

With these and other objects in view, as will be apparent to those skilled in the art, the invention resides in the combination of parts set forth in the specification and covered by the claims appended hereto.

In accordance with our invention, we provide a gas scrubber having a number of deflecting members located in the path of the gases. A supply of liquid is maintained in a tank located above the deflecting members, and liquid is distributed from the tank to the deflecting members, the parts preferably being so constructed and arranged that the liquid flows downwardly over the surfaces of these members in the form of a thin film which collects and removes dust particles from the gases. The deflecting members are supplied with liquid through restricted openings or orifices, and these distributing orifices are arranged in groups, each group being supplied from a separate receptacle. Each receptacle is supplied with liquid from the tank through one or more master orifices. The pressure above the surface of the liquid in the receptacles is preferably equal to the pressure in the gas passage. Since each master orifice supplies liquid to more than one and preferably to several of the distributing orifices, the master orifices can be made much larger than would otherwise be the case, and still a substantial head of liquid can be maintained above the master orifices without causing too great a flow. The receptacles are comparatively small, so that a lower liquid head may be utilized in them than would be practical in the main tank. Hence the distributing orifices can also be made of substantial size. Because of the equalization of the pressure in the receptacles and gas passage, the scrubber can be used with gases under suction without the necessity of using small distributing orifices to prevent excessive flow.

Referring to the drawing illustrating one embodiment of the invention, and in which like reference numerals indicate like parts, Fig. 1 is a longitudinal sectional elevation through the upper portion of a gas scrubber;

Figure 1:
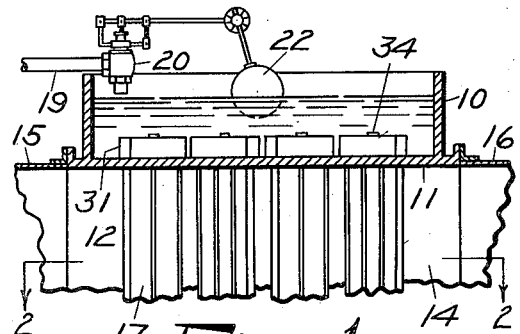
Figure 2:
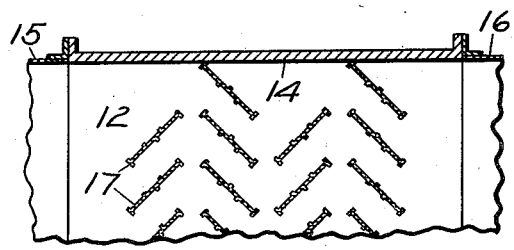
Fig. 2 is a partial section on the line 2—2 of Fig. 1.
Figure 3:
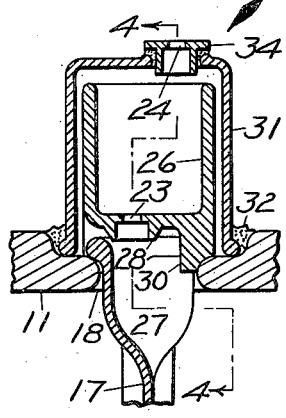
Fig. 3 is a greatly enlarged view in section showing the means for distributing water to one of the deflecting plates, the section being taken on the line 3—3 of Fig. 4.
Figure 4:
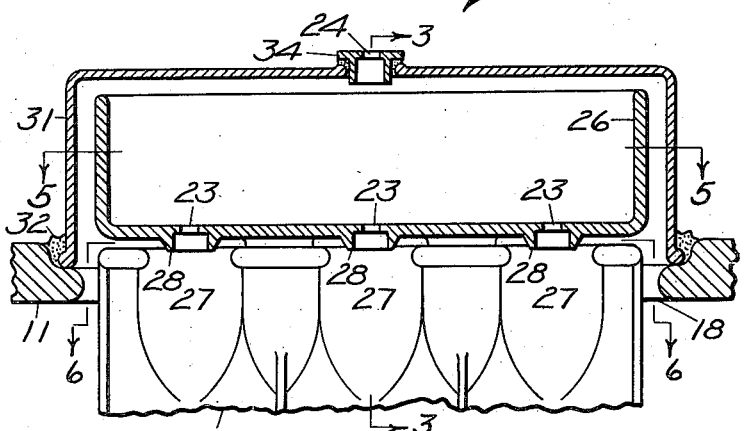
Fig. 4 is a section on the line 4—4 of Fig. 3.
Figure 5:
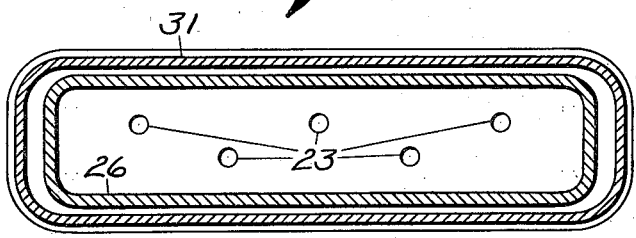
Fig. 5 is a section on the line 5—5 of Fig. 4.
Figure 6:
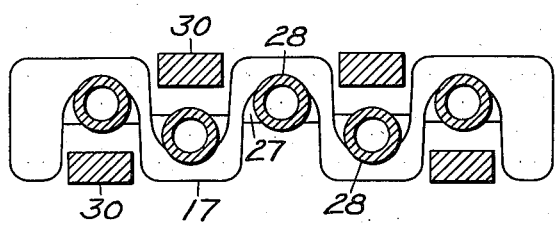
Fig. 6 is a section on the line 6—6 of Fig. 4.

In the drawing we have shown a gas scrubber of the general type disclosed in the application of Fred H. Daniels et al., Serial No. 608,716, filed May 2, 1932. The illustrated embodiment comprises a tank 10 having a flat horizontal bottom wall 11 which forms the upper wall of a gas passage 12. Vertical plates 14 form the side walls of this passage. An inlet duct 15 and an outlet duct 16 are connected to the passage 12, and a number of ribbed plates 17 are mounted in the passage to form deflecting surfaces in the path of the gases. These plates are preferably suspended at their upper edges from the wall 11 in rectangular openings or slots 18 in the wall, and arranged at an angle to the general direction of the gas flow, as shown in Fig. 2. The tank 10 is supplied with a suitable liquid, such as water, from a pipe 19, and this pipe is shown provided with a valve 20 controlled by a float 22, which serves to maintain a substantially constant water level in the tank. Water from the tank is distributed over the surfaces of the plates 17, and the present invention is primarily concerned with the means for obtaining this distribution.

In order to distribute the water in the desired manner, we provide a number of distributing orifices 23 which are divided into groups, and we supply each group with water through one or more master orifices 24. We prefer to use only one master orifice for each group, but it will be apparent that it would be within the spirit and scope of the invention to use several master orifices for each group, so long as there are a less number of master orifices than distributing orifices.

In the preferred construction illustrated, we have provided a group of five distributing orifices 23 for each deflecting plate 17, each group of orifices being located in the bottom of an open top receptacle 26 which is U-shaped in cross-section and mounted directly above the corresponding deflecting plate. The plates 17 are formed with pockets 27 in staggered arrangement which merge smoothly and gradually into the flat surfaces of the plates, and each orifice 23 is arranged to discharge a jet of water directly through the slot 18 and into one of these pockets. An annular flange 28 preferably surrounds each orifice 23 on the discharge side thereof to prevent any possibility of the water traveling as a film along the bottom of the receptacle 26 when the head therein is unusually low. These flanges are larger in internal diameter than the orifices. The receptacles 26 may be supported in any suitable manner, but they are preferably provided with downwardly extending feet 30 which rest upon the bottom wall 11 of the tank 10 on opposite sides of the slots 18.

Each receptacle is supplied with water through a master orifice 24, which is preferably located in the upper wall of a cover plate 31 mounted above the receptacle. Each cover plate as illustrated is shaped as an inverted U in cross-section, and the lower edge thereof is sealed to the wall 11 by any suitable means, such as water proof cement 32. The orifice 24 is preferably formed in a flanged ferrule 34 which is cemented to the cover plate. Since the receptacles 26 are not sealed to the wall 11, the space above the liquid in each receptacle is in direct communication with the gas passage 12, and the pressure in the gas passage will be effective in this space.

The operation of the invention will now be apparent from the above disclosure. Water is supplied to the tank 10 through the pipe 19, and the water level in the tank is maintained substantially constant by means of the float 22 and valve 20. The water level is preferably several inches above the master orifices 24, so that any slight inaccuracies in the leveling of the tank or in the operation of the float valve will have no appreciable effect upon the rate of flow or the distribution of the water. The water flows through the master orifices 24 into the receptacles 26, and thence through the distributing orifices 23 into the pockets 27 in the plates 17. From these pockets 27 the water spreads out in the form of a film flowing downwardly over the surfaces of the plates 17. Dust particles in the gases flowing through the passage 12 are collected by the water film and carried downwardly out of the gas stream.

Since each master orifice 24 supplies five of the distributing orifices 23, the master orifices can be made much larger than would be the case if the distributing orifices received water directly from the tank. Hence danger of plugging the orifices with foreign particles in the water is greatly reduced, and at the same time a substantial depth of water can be maintained in the tank. The receptacles 26 are comparatively small, and it is therefore practical to utilize a relatively small depth of water in these receptacles. Consequently, the distributing orifices 23 can also be made large. Furthermore, if the gases in the passage 12 are under suction it will be unnecessary to reduce the size of the orifices 23, since the pressure directly above the receptacles 26 is equal to that in the gas passage. The tank 10 is open at the top, so that the water distributing devices are readily accessible for inspection.

It is our intention that the term "orifice" as used in the claims should be interpreted as covering other forms of restricted openings which might be utlized, such as tubes, nozzles, etc., or openings of non-circular shape.

Having thus described our invention, what we claim as new and desire to secure by Letters Patent is:

1. A gas scrubber comprising a tank for liquid having a horizontal bottom wall forming the upper wall of a gas passage, said wall having slots therein, deflecting plates suspended in the gas passage with their upper ends in said slots, a receptacle mounted above each slot, the bottom of each receptacle being provided with a group of orifices arranged to distribute liquid to the deflecting plate therebeneath, and a cover plate mounted above each receptacle and sealed to the bottom wall of the tank, each cover plate having a master orifice in the top thereof arranged to deliver liquid from the tank to the receptacle.

2. A gas scrubber comprising a tank for liquid having a horizontal bottom wall forming the upper wall of a gas passage, said wall having slots therein, deflecting plates suspended in the gas passage with their upper ends in said slots, a receptacle mounted above each slot and resting on the bottom wall of the tank, the bottom of each receptacle being provided with a group of orifices arranged to distribute liquid to the deflecting plate therebeneath, and a cover plate shaped as an inverted U in cross-section mounted above each receptacle and sealed to the bottom wall of the tank, each cover plate having a master orifice in the top thereof arranged to deliver liquid from the tank to the receptacle.

3. A liquid distributing device for a gas scrubber comprising a receptacle which is U-shaped in cross-section and provided with a group of orifices in its bottom wall, and annular flanges surrounding the orifices on the discharge side thereof, the flanges being larger in internal diameter than the orifices 4. A gas scrubber comprising a tank for liquid having a horizontal bottom wall and mounted above a gas passage, said wall having openings therein, deflecting members located in the gas passage, receptacles located adjacent the openings and arranged to provide distributing orifices from which jets of liquid impinge on the surfaces of the deflecting members, and cover plates over the openings which provide master orifices arranged to deliver liquid from the tank to the receptacles.

5. A gas scrubber comprising a tank for liquid having a horizontal bottom wall and mounted above a gas passage, said wall having openings therein, deflecting members located in the gas passage with their upper portions adjacent to the openings, a receptacle mounted adjacent to each opening and provided with a group of orifices arranged to distribute liquid to the deflecting member therebeneath, and a cover plate mounted above each receptacle and sealed to the bottom wall of the tank, each cover plate providing a master orifice arranged to deliver liquid from the tank to the receptacle.

6. A gas scrubber comprising a tank for liquid having a horizontal bottom wall and mounted above a gas passage, said wall having openings therein, deflecting members located in the gas passage with their upper portions adjacent to the openings, a receptacle mounted above each opening, the bottom of each receptacle being provided with a group of orifices arranged to distribute liquid to the deflecting member therebeneath, and a cover plate mounted above each receptacle and sealed to the bottom wall of the tank, each cover plate providing a master orifice arranged to deliver liquid from the tank to the receptacle.

7. A gas scrubber comprising a tank for liquid having a horizontal bottom wall and mounted above a gas passage, said wall having openings therein, deflecting members located in the gas passage, receptacles located adjacent the openings and each provided with a series of distributing orifices from which jets of liquid impinge on the surfaces of the deflecting members, and means providing a master orifice for each receptacle to control the flow of liquid thereto from the tank.

8. A gas scrubber comprising an elevated body of liquid, a gas passage therebeneath, deflecting members mounted in the gas passage, a plurality of comparatively small receptacles mounted above the deflecting members and each provided with a series of distributing orifices from which jets of liquid impinge on the surfaces of the deflecting members, and means providing a master orifice for each receptacle to deliver liquid thereto from the body of liquid.

9. A gas scrubber comprising an elevated body of liquid, a gas passage therebeneath, deflecting members mounted in the gas passage, a plurality of comparatively small receptacles mounted above the deflecting members and each provided with a series of openings in its bottom wall which direct streams of liquid downwardly over the surfaces of the deflecting members therebeneath, and means providing a plurality of master orifices through which liquid may flow from the body of liquid to the respective receptacles.

10. A gas scrubber comprising an elevated body of liquid, a gas passage therebeneath, deflecting members mounted in the gas passage, a plurality of comparatively small receptacles mounted above the deflecting members, and means providing a plurality of master orifices through which liquid may flow from the body of liquid to the respective receptacles, each receptacle being provided with a series of openings in its bottom wall which direct streams of liquid downwardly over the surfaces of the deflecting members therebeneath, the space above the liquid in each receptacle being in direct communication with the gas passage to ensure equalization of pressures.

CARL H. RICH.
KEVORK K. NAHIGYAN.